(12) United States Patent
Kim

(10) Patent No.: US 7,873,747 B2
(45) Date of Patent: Jan. 18, 2011

(54) DEVICE AND METHOD FOR TRANSMITTING DATA

(75) Inventor: Kwang-Jun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1030 days.

(21) Appl. No.: 11/657,414

(22) Filed: Jan. 24, 2007

(65) Prior Publication Data

US 2007/0192511 A1 Aug. 16, 2007

(30) Foreign Application Priority Data

Jan. 24, 2006 (KR) .................... 10-2006-0007503

(51) Int. Cl.
G06F 15/16 (2006.01)
H04L 12/26 (2006.01)

(52) U.S. Cl. .................. 709/247; 709/245; 370/234; 370/235; 370/253

(58) Field of Classification Search ............... 709/202, 709/247, 245; 370/234, 235, 253
See application file for complete search history.

(56) References Cited

U.S. PATENT DOCUMENTS

| | | | | |
|---|---|---|---|---|
| 5,155,592 A * | 10/1992 | Verbiest et al. | .......... | 375/240.2 |
| 5,805,932 A * | 9/1998 | Kawashima et al. | .......... | 710/68 |
| 5,808,690 A * | 9/1998 | Rich | .......... | 345/505 |
| 5,894,588 A * | 4/1999 | Kawashima et al. | .......... | 710/68 |
| 7,111,094 B1* | 9/2006 | Liu et al. | .......... | 710/65 |
| 7,319,697 B2* | 1/2008 | Duranton et al. | .......... | 370/392 |
| 7,355,533 B2* | 4/2008 | Stromberg et al. | .......... | 341/87 |
| 7,580,585 B2* | 8/2009 | Malvar | .......... | 382/245 |
| 7,773,509 B2* | 8/2010 | Rahman et al. | .......... | 370/230 |
| 2004/0218626 A1* | 11/2004 | Tyldesley et al. | .......... | 370/464 |
| 2007/0040710 A1* | 2/2007 | Tomic | .......... | 341/50 |

* cited by examiner

Primary Examiner—Ario Etienne
Assistant Examiner—Sargon N Nano
(74) Attorney, Agent, or Firm—The Farrell Law Firm, LLP

(57) ABSTRACT

An apparatus and method for transmitting data. The method for transmitting data includes compressing data to be transmitted and configuring a plurality of packets, arranging the packets such that the entropy mean between the packets neighboring in any one side approximates to a reference entropy set in proportion to the maximum data processing calculation amount of a receiving side portable terminal, referring to the compression entropy of each of the packets, and setting a transmission order in accordance with the arranged order; and transmitting the packets in accordance with the transmission order.

5 Claims, 5 Drawing Sheets

DEVICE AND METHOD FOR TRANSMITTING DATA

PRIORITY

This application claims priority to an application entitled "Device and Method for Transmitting Data" filed with the Korean Intellectual Property Office on Jan. 24, 2006 and assigned Serial No. 2006-7503, the contents of which are incorporated herein by reference.

BACKGROUND OF THE INVENTION

1. Field of the Invention

The present invention relates to data transmission, and more particularly to a device and a method for transmitting data, wherein data is transmitted considering a packet processing calculation amount of a receiving side terminal when compressing the data and then transmitting them by the packet.

2. Description of the Related Art

With the development of mobile communication systems and integrated circuits, a variety of portable electronic terminals i.e., portable terminals, have been developed and produced. Typical examples of such portable terminals include a mobile communication terminal, a PMP (Portable Multimedia Player), a PSP (Play Station Portable), a PNP (Portable Navigation Player) and the like. Generally, portable terminals provide a multimedia function emphasizing user's entertainment functions such as moving image reproduction, music file reproduction, a game function and the like. In order to provide the multimedia function, portable terminals typically download and store multimedia data through an external data transmission device or communication system.

In general, the portable terminals download multimedia data transmitted in accordance with a real-time compression method when downloading the multimedia data. In the real-time compression method, a device for transmitting data compresses multimedia data files to be transmitted in real time and then sequentially transmits data using transmission packets. However, the multimedia data may have a partially different compression rate depending on a characteristic of data even within one multimedia data file. On this account, transmission packets with compression rates different from one another are transmitted to a receiving side terminal in the real-time compression method. If a receiving terminal receives transmission packets, it restores their compression to store them in a predetermined storage area. At this time, since the compression rates of the transmission packets are not identical with one another, the amount of data processing calculations of a receiving terminal controller, which are required when processing the transmission packets, is not also uniform. That is, in a case where transmission packets with a high compression rate are processed, the amount of data processing calculations of the receiving terminal controller increases and in a case where transmission packets with a low compression rate are processed, the amount of data processing calculations of the receiving terminal controller decreases.

Accordingly, problems may be encountered when the amount of data processing calculations increases to a degree at which the receiving terminal controller loads the maximum amount of data processing calculations and, at the same time, another minimum data processing calculation is also required. This will be described in FIG. 1 which is a graph illustrating a compression entropy degree of packets sequentially transmitted and a packet processing calculation amount for each packet in a receiving terminal according to conventional methods art.

Referring to FIG. 1, packets 1 to 8 transmitted from a device 19 have various compression entropies. The compression entropy is proportional to the compression rate of data contained in the packets. An amount of data processing calculations required by a portable terminal 20 receiving the aforementioned packets is shown. It can be seen that each data calculation amount in a row of calculation amounts corresponding to each packet in a row of entropies is proportional to the compression entropy of each of the packets. Numerals in brackets inside the packets denote a compression entropy degree and an amount of data processing calculations, respectively. As such, a data transmission method in accordance with conventional real-time data compression methods causes the controller of the portable terminal 20 to operate inefficiently.

Moreover, in a case of a portable terminal, there is a structural limitation in that its external size should be minimized and there is a limitation on processing performance of a controller provided according thereto. On this account, in a case where large-capacity multimedia data is downloaded and stored in accordance with the aforementioned real-time data compression method, a case may more frequently occur in which the required amount of calculations may meet or exceed a maximum amount of possible data processing calculations in the controller of the portable terminals. Accordingly, there is a problem in that processing time is delayed and excess power may be consumed.

SUMMARY OF THE INVENTION

Accordingly, the present invention has been made to solve the above-mentioned problems occurring in the prior art, and it is an object of the present invention to provide an apparatus and method for transmitting data.

It is another object of the present invention to provide an and a method for transmitting data, wherein a transmission order of packets is controlled to transmit them considering a calculation amount of data in a receiving terminal.

In order to accomplish these and other objects of the present invention, according to an aspect of the present invention, there is provided a method for transmitting data, the method including compressing data to be transmitted and configuring a plurality of packets; arranging the packets such that the entropy mean between the packets neighboring on any one side approximates to a reference entropy set in proportion to the maximum amount of data processing calculation of a receiving side portable terminal, referring to the compression entropy of each of the packets, and setting a transmission order in accordance with the arranged order; and transmitting the packets in accordance with the transmission order.

In order to accomplish these and other objects of the present invention, according to another aspect of the present invention, there is provided a device for transmitting data, the device including a memory for storing data to be transmitted to a portable terminal and storing the maximum amount of data processing calculation of a plurality of portable terminals and reference and default entropies corresponding to each of the maximum data processing calculation amounts; a data compressor for compressing a data file read from the memory at an appropriate ratio depending on a state of data and configuring data as packets so as to output them; a packet scheduler for grasping the entropy of each input packet to arrange the packets such that the entropy mean of the packets neighboring in any one side, i.e. arranged so that a compressed entropy mean of neighboring packets may not exceed a reference entropy, wherein the neighboring packets denote packets set in accordance with the transmission order, approximates to the set reference entropy, and setting a transmission order in accordance with the arranged order to output them in accordance with the set transmission order if a predetermined number of packets are input from the data compressor; a packet transmitter for transmitting the packets input from the packet scheduler to the receiving side portable terminal; and a controller for controlling the memory, the data compressor, the packet scheduler and the packet transmitter, and retrieving the maximum data processing calculation amount of the receiving side portable terminal and then detecting a reference entropy corresponding to the retrieved maximum data processing calculation amount so as to set the detected reference entropy in the packet scheduler if data transmission is requested from the receiving side portable terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
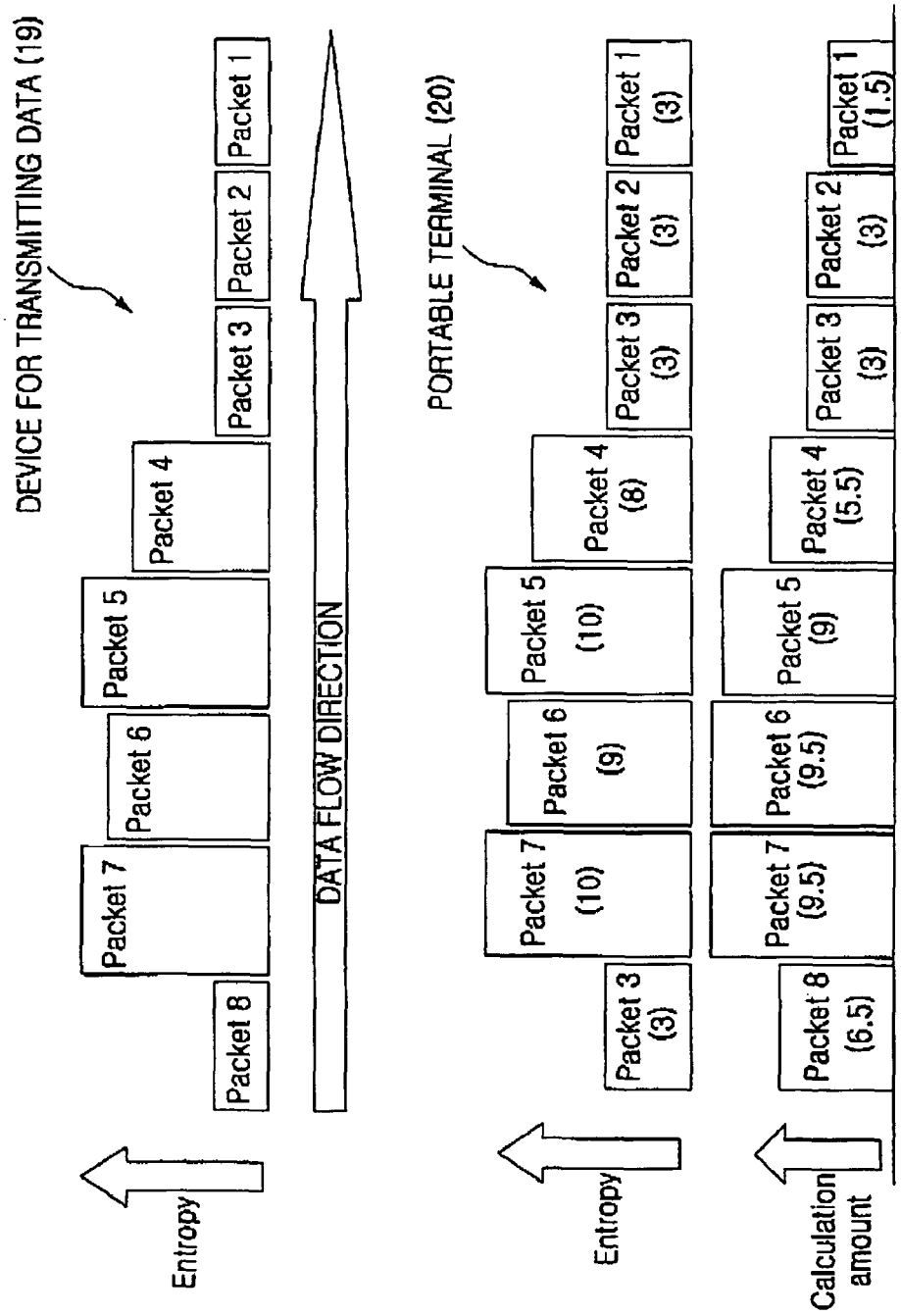
FIG. 1 is a graph illustrating showing a compression entropy degree of packets sequentially transmitted and a packet processing calculation amount for each packet in a receiving terminal according to conventional methods.
Figure 2:
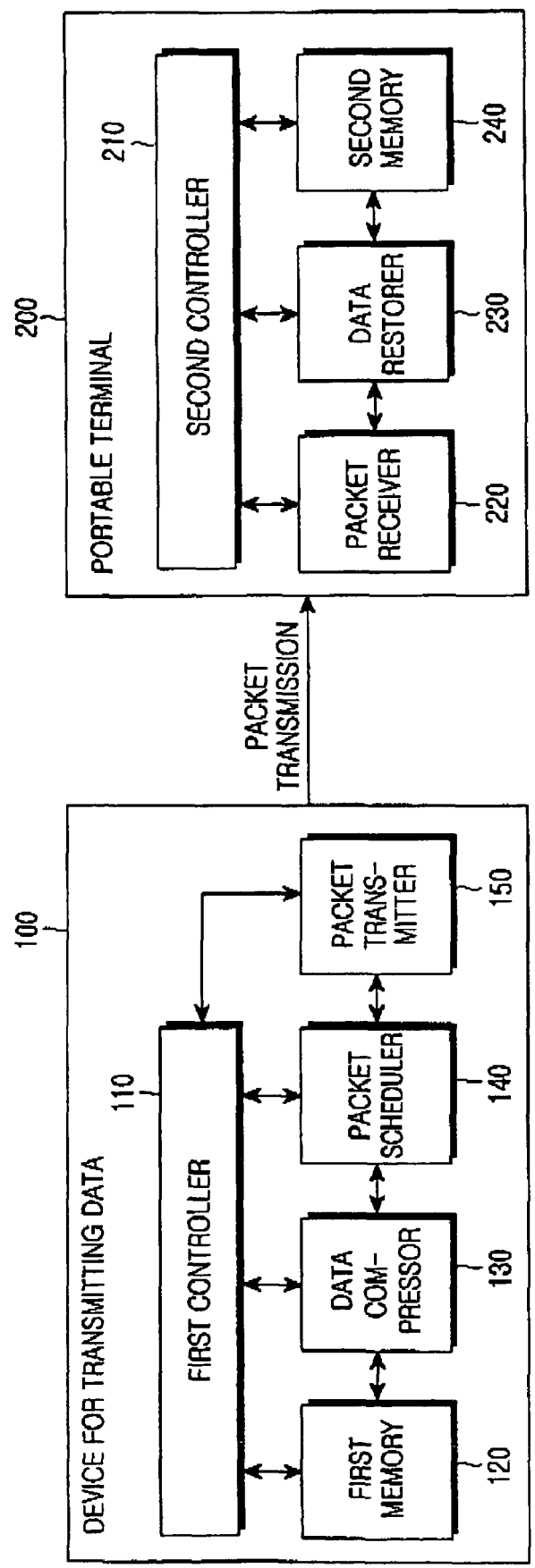
FIG. 2 is a block diagram illustrating a device for transmitting data and a portable terminal according to the present invention.

A portable terminal may receive data from a communication system such as a mobile communication system or a service server, and download data from a personal computer. A device for transmitting data, which is configured according to the present invention, is a device for transmitting arbitrary data to a portable terminal considering the amount of data processing calculations of corresponding receiving side terminals, and can be installed in any system for transmitting data to portable terminals. The arbitrary data may contain various types of data that can be transmitted to the portable terminal including multimedia data. A configuration of a device for transmitting data and a portable terminal for receiving data, according to the present invention, will be described with reference to FIG. 2. FIG. 2 is a block diagram illustrating a configuration of a device for transmitting data and a portable terminal according to the present invention. Referring to FIG. 2, the device 100 for transmitting data according to the present invention, includes a first controller 110, a first memory 120, a data compressor 130, a packet scheduler 140 and a packet transmitter 150.

The first memory 120 stores data to be transmitted to a portable terminal. Further the first memory 120 stores maximum data processing calculation amounts corresponding to the plurality of portable terminals and reference and/or default entropies corresponding to each of the maximum data processing calculation amounts. The reference entropy is set in proportion to the corresponding maximum data processing calculation amount.

The data compressor 130 compresses a data file read from the first memory 120 at a predetermined ratio depending on the status of data under the control of the first controller 110 and configures the compressed data as packets to output the packets to the packet scheduler 140. Since data can be compressed depending on a characteristic of data to be compressed in a portion of the data file even though the data belongs to one data file, the compression rates of the packets output from the data compressor 130 are not identical. Accordingly, the compression entropies of the packets are typically not identical.

If the predetermined number of packets are input from the data compressor 130, the packet scheduler 140 determines the entropy of each of the input packets so as to set a transmission order of the packets with the predetermined number of the packets so that a mean of the entropies of packets neighboring on any one side does not exceed the reference entropy set by the first controller 110 if possible, and outputs the packets to the packet transmitter 150 in accordance with the set transmission order thereof under the control of the first controller 110. After detecting entropies of the compressed packets, the packet transmission order is arranged so that the entropy mean of neighboring packets may not exceed reference entropy, and entropies of the neighboring packets output packets to the packet transmitter 150. The reference entropy is set by the first controller 110, and if the maximum data processing calculation amount of the terminal to receive data is stored in the first memory 120, the first controller 110 detects a reference entropy corresponding to the stored maximum data processing calculation amount so as to transmit the reference entropy to the packet scheduler 140. Unless the maximum data processing calculation amount of the portable terminal to receive data is detected from the first memory 120, the controller 110 detects a default entropy to set the default entropy in the packet scheduler 140.

The packet transmitter 150 transmits packets input from the packet scheduler 140 to the receiving side terminal in accordance with an input order.

The first controller 110 generally controls a process of transmitting data according to the present invention, and controls the first memory 120, the data compressor 130, the packet scheduler 140 and the packet transmitter 150. Further, if the first controller 110 receives a request for transmitting data of an arbitrary receiving side portable terminal or for transmitting arbitrary data from the outside (i.e., system and data generated by a supervisor of the device 100 for transmitting data or a communication system having the device 100 installed therein), to the receiving side portable terminal, the first controller 110 controls the correspondent data to be input from the first memory 120 to the data compressor 130. The first controller 110 sends transmission data information containing size and packet information on data to be transmitted to the receiving side terminal. Further, if the maximum data processing calculation amount of the receiving side terminal is stored in the first memory 120 the first controller 110 detects a reference entropy corresponding to the stored maximum data processing calculation amount to transmit the reference entropy to the packet scheduler 140. Unless the maximum data processing calculation amount of the portable terminal to receive data is detected from the first memory 120, the first controller 110 detects a default entropy to set the default entropy in the packet scheduler 140. Thereafter, the first controller 110 controls the packet scheduler 140 to set a transmission order of packets in accordance with the set reference entropy.

Meanwhile, a portable terminal 200 capable of receiving data transmitted from the device 100 for transmitting data includes a second controller 210, a packet receiver 220, a data restorer 230 and a second memory 240.

The packet receiver 220 receives data transmitted from the device 100 for transmitting data and outputs the received data to the data restorer 230. The data restorer 230 restores input compressed data under the control of the second controller 210 and stores the restored input data in a correspondent storage area of the second memory 240 in accordance with storage area setting information input from the second controller 210. Unless the input data is in a compressed state, the data restorer 230 stores the input data in the correspondent area of the second memory 240 without a restoring process.

The second controller 210 controls the packet receiver 220, the data restorer 230, and the second memory 240 in accordance with a general process of storing received packets in the second memory 240. The second controller 210 requests an arbitrary data transmission to the device 100 for transmitting data on a user's demand. Thereafter, if transmission data information is received from the device 100 for transmitting data, the second controller 210 sets a storage area of the second memory 240 referring to size information on the entire received data contained in the transmission data information, and outputs the storage area information set in the second memory 240 to the data restorer 230. Further, if packets are received from the device 100 for transmitting data, the second controller 210 controls the packet receiver 220, the data restorer 230 and the second memory 240 such that the received packets are stored in the second memory 240.

An operational process of the device 100 for transmitting data and the portable terminal 200, which are configured as described above, is shown in FIGS. 3 and 4.

Figure 3:
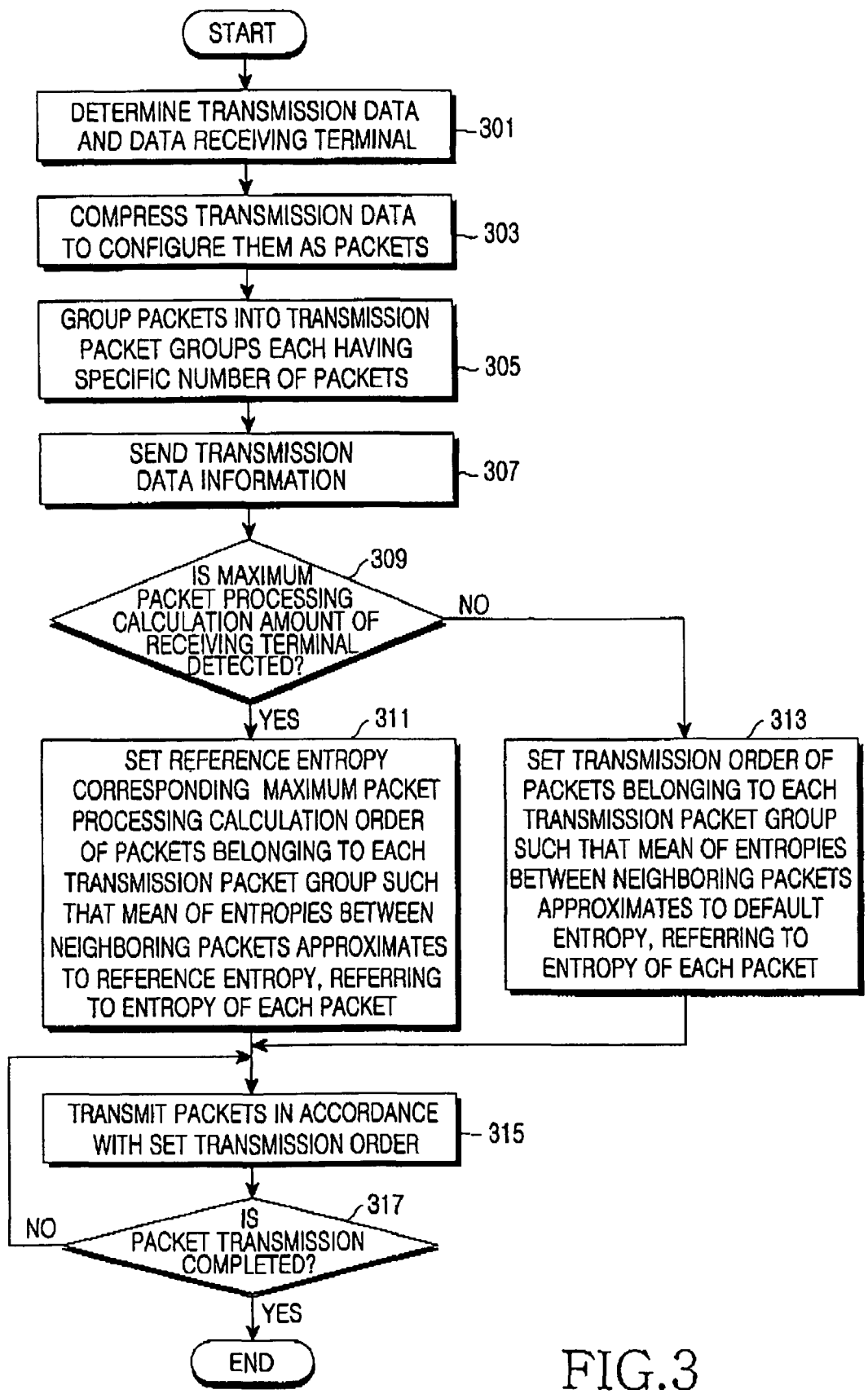
FIG. 3 is a flowchart illustrating an operational process of the device for transmitting data according to the present invention.
Figure 4:
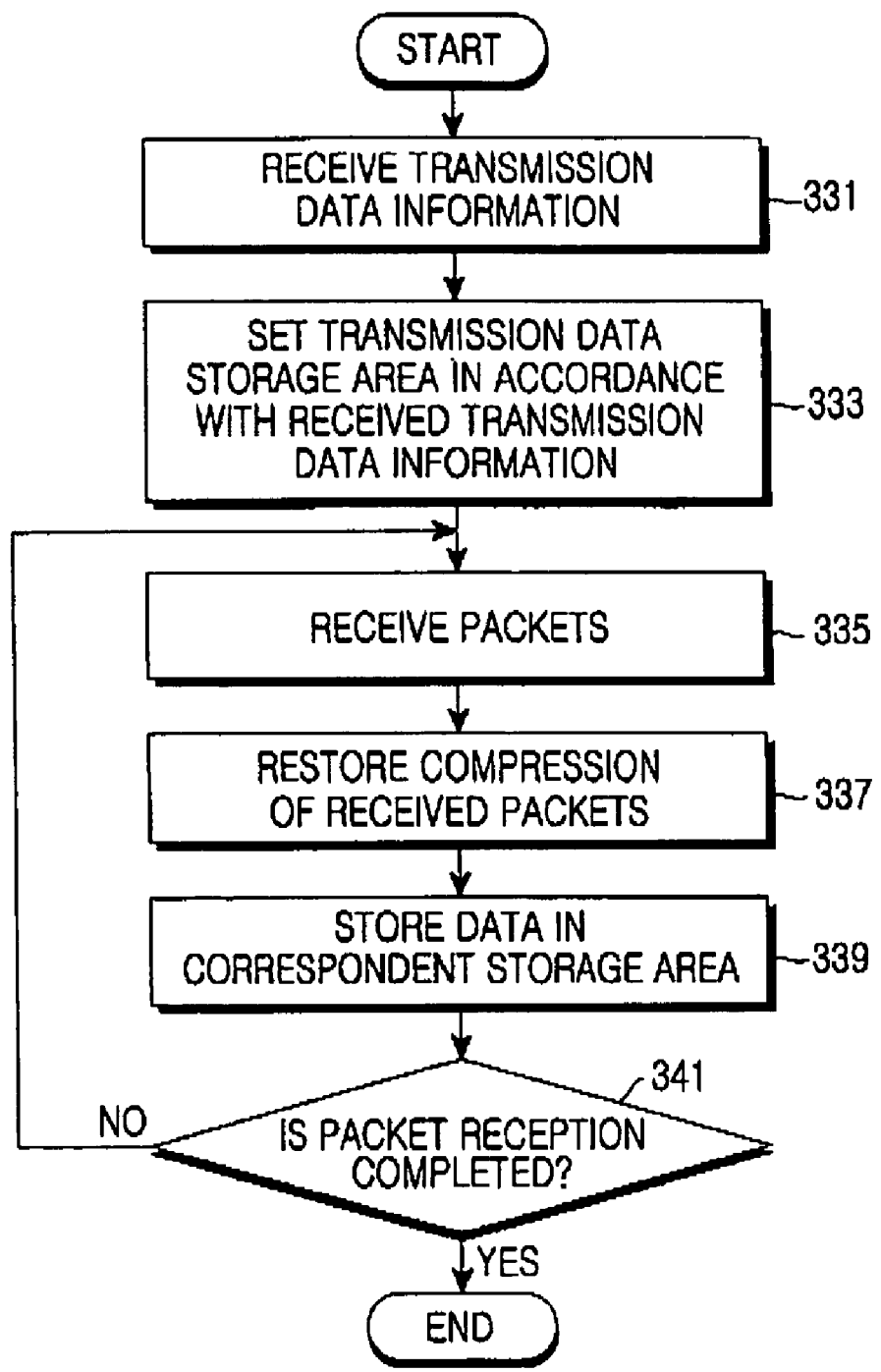
FIG. 4 is a flowchart illustrating an operational process of the portable terminal according to the present invention.

FIG. 3 is a flowchart illustrating an operational process of the device for transmitting data according to the present invention, and FIG. 4 is a flowchart illustrating an operational process of the portable terminal according to the present invention.

Referring to FIG. 3, a data transmission process of the device 100 for transmitting data will be discussed in detail as follows. If data to be transmitted and the portable terminal 200 to receive the transmitted data are determined at step 301, the device 100 for transmitting data proceeds to step 303. The device 100 for transmitting data compresses the data to be transmitted so as to configure the data as packets at step 303, and proceeds to step 305. The device 100 for transmitting data groups the configured packets into transmission packet groups each having a specific number of packets at step 305 and proceeds to step 307. The device 100 for transmitting data sends transmission data information to the portable terminal 200 at step 307 and proceeds to step 309. The device 100 for transmitting data identifies whether the maximum packet processing calculation amount of the receiving side portable terminal 200 is detected at step 309 and proceeds to step 311 if it is detected. Unless the maximum packet processing calculation amount of the receiving side portable terminal 200 is detected, the device 100 for transmitting data proceeds to step 313. The device 100 for transmitting data sets a reference entropy corresponding to the detected maximum data processing calculation amount of the receiving side portable terminal 200 and sets a transmission order by arranging packets belonging to each of the transmission packet groups such that the mean of entropies between two packets neighboring on any one side approximates to the reference entropy, referring to the entropy of each of the packets at step 311 so as to proceed to step 315.

Meanwhile, if the maximum data processing calculation amount of the receiving side portable terminal 200 is not detected at step 309, the device 100 for transmitting sets a transmission order by arranging packets belonging to each of the transmission packet groups such that the mean of entropies between two packets neighboring on any one side approximates to the default entropy, referring to the entropy of each of the packets at step 313 so as to proceed to step 315.

Figure 5:
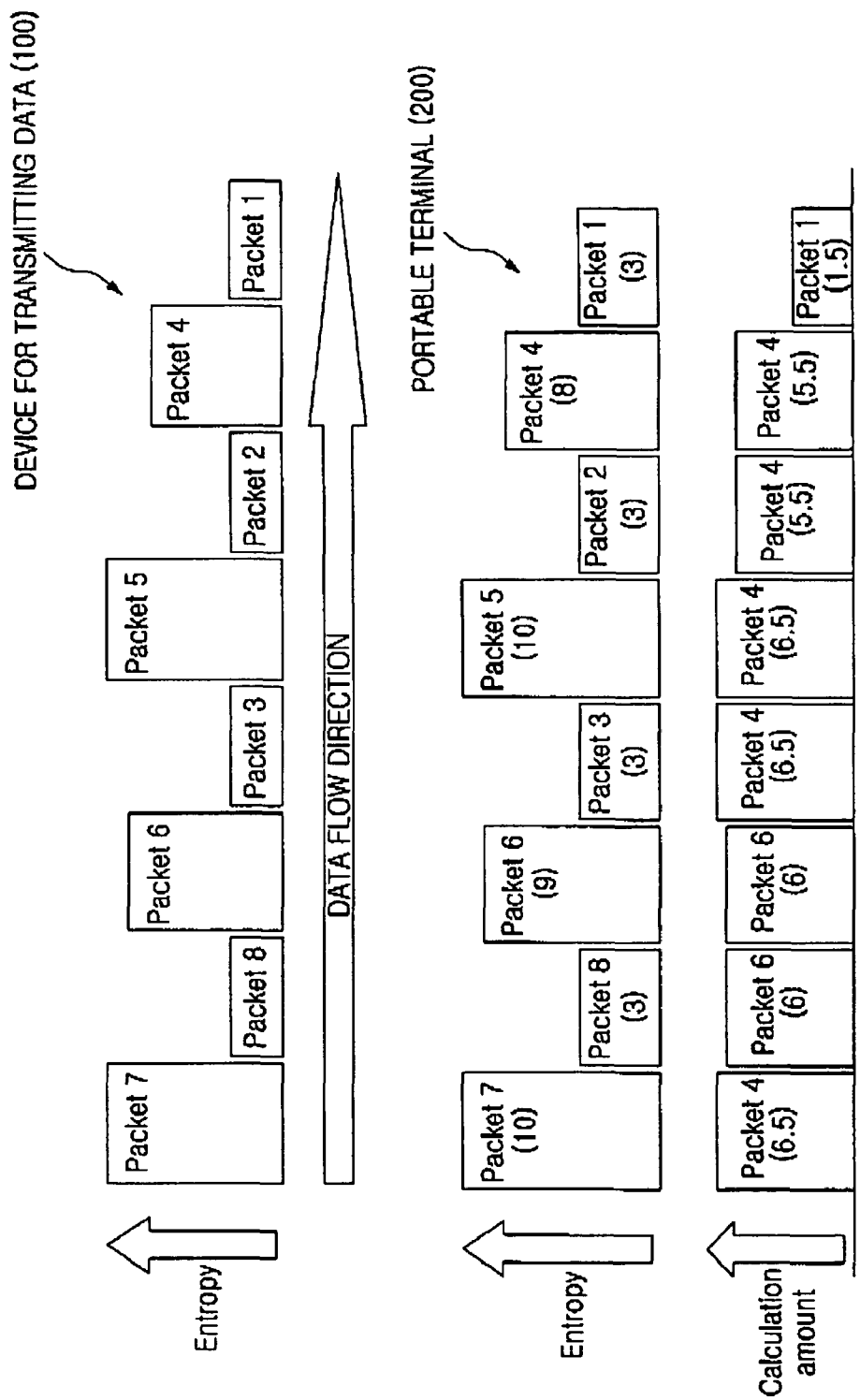
FIG. 5 is a view showing a compression entropy degree of packets sequentially transmitted and a packet processing calculation amount for each packet in a receiving terminal according to the present invention.

FIG. 5 is a graph illustrating a compression entropy degree of packets sequentially transmitted and a packet processing calculation amount for each packet in a receiving terminal according to the present invention and illustrates an example in which a transmission order of packets is set in accordance with the reference entropy at steps 311 and 315.

As shown in FIG. 5, the transmission order of packets including packets 1 to 8, which is set by the device 100 for transmitting data, is set in an order of the packets 1, 4, 2, 5, 3, 6, 8, and 7 considering a reference entropy and entropies of each of the packets. Since a degree of the entropies of the packets 1, 2, 3, and 8 is low and the entropies of the packets 4, 5, 6, and 7 is high, the transmission order is set such that the packets with low and high entropies are mixed with one another. Accordingly, the mean of the entropies of the neighboring packets approximates to the reference entropy.

Meanwhile, referring back to FIG. 3, the device 100 for transmitting data transmits the packets in accordance with the transmission order set as described above at step 315 and proceeds to step 317. If the packet transmission is completed, the device 100 for transmitting data ends the transmission operation at step 317.

Meanwhile, referring to FIG. 4, if the receiving side portable terminal 200 receives transmission data information at step 331, it proceeds to step 333. The portable terminal 200 sets a transmission data storage area in accordance with the received transmission information at step 333 and proceeds to step 335. If the portable terminal receives packets at step 335, it proceeds to step 337. The portable terminal 200 restores the compression of the received packets at step 337 and proceeds to step 339. The portable terminal 200 stores data in the correspondent storage area at step 339 and proceeds to step 341. If it is determined that the packet reception is complete at step 341, the portable terminal 200 ends the packet reception and storage process.

Referring to FIG. 5, the order of packets received by the portable terminal 200 becomes an order of the packs 1, 4, 2, 5, 3, 6, 8, and 7 in accordance with the set order. The entropy mean value of two packets neighboring on any one side is uniform as approximately 5.5 to 6.5. Accordingly, a data processing calculation amount of the portable terminal 200 becomes uniform in a set range, for example, between 5.5 to 6.5, corresponding to each of the packets, and the maximum data processing calculation amount of the portable terminal 200 does not exceed the set range limit. In FIG. 5, numerals in brackets inside the packets arranged in the entropy row of the portable terminal 200 are numerical values indicating an entropy degree and numerals in brackets inside the packets arranged in the calculation amount row are numerical values indicating a data processing calculation amount degree. Since a case where the portable terminal 200 buffers two packets when processing data is shown in FIG. 5, the data processing amounts can be indicated as the numeral values described in FIG. 5.

As described above, the present invention sets a transmission order of packets to be transmitted considering a compression entropy and the maximum data processing calculation amount of a receiving side portable terminal, and transmits the packets in accordance with the set transmission order so that the entire data processing calculation amount of the portable terminal can be uniform when the portable terminal receives and stores the packets. Accordingly, a case where data are processed while exceeding the maximum data processing calculation amount of the portable terminal can be prevented if possible.

According to the present invention, the transmission of transmitted data may be configured such that the data is transmitted to the portable terminal 200 just before packet transmission. Further, the maximum data processing calculation amount of the portable terminal 200 may be configured such that it is transmitted from the portable terminal 200 to the device 100 for transmitting data when data transmission is requested. Furthermore, a setting of a reference entropy may be configured such that the reference entropy is set in the packet scheduler 140 before a compression process of data to be transmitted is accomplished. That is, the setting of the reference entropy should be accomplished only before a transmission arrangement of packets is set from a time point when transmission of arbitrary data has been determined. Further, although, for a case where data to be transmitted are large, a part of packets constituting transmission data is grouped into a predetermined number of packets so as to set a transmission order within the packets belonging to each group in the aforementioned embodiment, this may be configured so that the transmission is set for all packets according to the present invention.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for transmitting data, comprising:
a memory for storing data to be transmitted to a portable terminal and storing maximum data processing calculation amounts of a plurality of portable terminals and reference and default entropies corresponding to each of the maximum data processing calculation amounts;
a data compressor for compressing a data file read from the memory at a predetermined ratio depending on a state of data, configuring packets including the data, outputting the packets;
a packet scheduler for receiving the packets output by the data compressor, detecting an entropy of each packet, arranging the packets such that an entropy mean calculated for entropies of any two neighboring packets is approximately equal to a reference entropy, and setting a transmission order in accordance with the arranged packets to output the packets in accordance with the set transmission order;
a packet transmitter for transmitting the packets input from the packet scheduler to the portable terminal; and
a controller for controlling the memory, the data compressor, the packet scheduler, and the packet transmitter, retrieving a maximum data processing calculation amount corresponding to the portable terminal, and detecting the reference entropy corresponding to the retrieved maximum data processing calculation amount so as to set it in the packet scheduler, when data transmission is requested from the portable terminal.

2. The device as claimed in claim 1, wherein the controller detects a default entropy corresponding to the retrieved maximum data processing calculation amount and sets the default entropy in the packet scheduler.

3. The device as claimed in claim 2, wherein the default entropy is proportional to a compression rate of the packets.

4. The device as claimed in claim 3, wherein the controller transmits transmission data information comprising size information corresponding to data to be transmitted to the portable terminal if data transmission is requested from the portable terminal.

5. The device as claimed in claim 4, wherein the maximum data processing calculation amount of the portable terminal is transmitted to the device when requesting the data transmission.

* * * * *